United States Patent
Yagishita (10) Patent No.: US 11,643,039 B2
(45) Date of Patent: May 9, 2023

(54) INSTRUMENT PANEL

(71) Applicants: TOYOTA JIDOSHA KABUSHIKI KAISHA, Toyota (JP); SUBARU CORPORATION, Tokyo (JP)

(72) Inventor: Yuichi Yagishita, Toyota (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/591,918

(22) Filed: Feb. 3, 2022

(65) Prior Publication Data
US 2022/0297625 A1    Sep. 22, 2022

(30) Foreign Application Priority Data

Mar. 22, 2021    (JP) .............................. JP2021-047292

(51) Int. Cl.
| | | |
|---|---|---|
| B60R 21/045 | (2006.01) | |
| B62D 25/14 | (2006.01) | |
| B60H 1/00 | (2006.01) | |
| B60R 16/02 | (2006.01) | |

(52) U.S. Cl.
CPC ....... B60R 21/045 (2013.01); B60H 1/00564 (2013.01); B60R 16/0215 (2013.01); B62D 25/142 (2013.01)

(58) Field of Classification Search
CPC . B60R 21/045; B60R 16/0215; B60R 21/055; B60H 1/00564; B60H 1/00557; B62D 25/142; B62D 25/145; B62D 25/14
See application file for complete search history.

(56) References Cited

U.S. PATENT DOCUMENTS

2013/0118777 A1 *    5/2013    Yamaguchi ......... B60R 16/0215
                                                            174/135

FOREIGN PATENT DOCUMENTS

| CN | 205168423 U | * | 4/2016 | ......... B60R 16/0215 |
|---|---|---|---|---|
| JP | 2002364779 A | * | 12/2002 | ......... B60R 16/0215 |
| JP | 2003327016 A | * | 11/2003 | ......... B60R 16/0215 |
| JP | 2004328953 A | * | 11/2004 | ......... B60R 16/0215 |
| JP | 2006103389 A | * | 4/2006 | |
| JP | 2008-132841 A | | 6/2008 | |
| JP | 2009-012514 A | | 1/2009 | |
| JP | 2015-024784 A | | 2/2015 | |
| JP | 2018052209 A | * | 4/2018 | ............... B60K 1/00 |
| WO | WO-2009084302 A1 | * | 7/2009 | ......... B60R 16/0215 |
| WO | WO-2013180251 A1 | * | 12/2013 | ......... B60R 16/0215 |

(Continued)

*Primary Examiner* — Paul N Dickson
*Assistant Examiner* — Matthew D Lee
(74) *Attorney, Agent, or Firm* — Dinsmore & Shohl LLP (57) ABSTRACT

An instrument panel includes an instrument panel body fixed to a vehicle body, and a cover that covers a space of the instrument panel body from a rear in a front-rear direction of a vehicle and faces an occupant in the front-rear direction of the vehicle. The instrument panel body includes a harness holder configured to hold a wire harness arranged in a vehicle width direction. The harness holder extends along the vehicle width direction in the space of the instrument panel body, and includes a fragile portion provided in at least one position in a longitudinal direction of the harness holder. A sectional area of the fragile portion is smaller than a sectional area of the other portion of the harness holder.

11 Claims, 5 Drawing Sheets

(56) References Cited

FOREIGN PATENT DOCUMENTS

| WO | WO-2019004214 A1 | * | 1/2019 | ......... B60R 16/0215 |
| WO | WO-2021010253 A1 | * | 1/2021 | ......... B60R 16/0215 |

* cited by examiner

INSTRUMENT PANEL

CROSS-REFERENCE TO RELATED APPLICATION

This application claims priority to Japanese Patent Application No. 2021-047292 filed on Mar. 22, 2021, incorporated herein by reference in its entirety.

BACKGROUND

1. Technical Field

The technology disclosed herein relates to an instrument panel.

2. Description of Related Art

When a frontal collision occurs to a vehicle, for example, an occupant may come into strong contact with an instrument panel. In such a case, the instrument panel is required to deform to reduce a reaction force that the occupant may receive from the instrument panel. For example, Japanese Unexamined Patent Application Publication No. 2009-012514 (JP 2009-012514 A) describes this kind of technology.

SUMMARY

It is also effective to reduce the height of the instrument panel from the viewpoint of securing space inside the vehicle and expanding a forward view of occupants. Meanwhile, many members such as wire harnesses and ducts for air conditioning are housed inside the instrument panel. The reduction in the height of the instrument panel causes reduction in the volume of the instrument panel, thereby limiting the degree of freedom in terms of arrangement of those members. Taking other design requirements into consideration, it may be necessary to arrange a wire harness near the instrument panel. In this case, the deformation of the instrument panel may unexpectedly be hindered by the wire harness and a structure that holds the wire harness. This specification provides a technology capable of solving such a problem at least partially.

An instrument panel according to one aspect of the present disclosure includes an instrument panel body and a cover. The instrument panel body is fixed to a vehicle body. The cover covers a space of the instrument panel body from a rear in a front-rear direction of a vehicle and faces an occupant in the front-rear direction of the vehicle. The instrument panel body includes a harness holder configured to hold a wire harness arranged in a vehicle width direction. The harness holder extends along the vehicle width direction in the space of the instrument panel body, and includes a fragile portion provided in at least one position in a longitudinal direction of the harness holder. A sectional area of the fragile portion is smaller than a sectional area of another portion of the harness holder.

According to the structure described above, the occupant may come into contact with the cover when a forward collision occurs to the vehicle. In this case, by the cover in contact with the occupant entering the space of the instrument panel body, the instrument panel can be deformed greatly. The wire harness is arranged in the space of the instrument panel body. The harness holder configured to hold the wire harness is provided to cross the space. The harness holder includes the fragile portion whose sectional area is locally reduced. Therefore, even if the cover that enters the space of the instrument panel body interferes with the harness holder, displacement of the cover is not excessively restricted owing to deformation or breakage of the harness holder at the fragile portion. Even if the wire harness is arranged near the instrument panel, the instrument panel can sufficiently be deformed by, for example, moving the cover toward the instrument panel body when the cover is forcefully pushed.

In the instrument panel according to the aspect described above, the fragile portion may have a first cutout extending from an upper edge toward a lower edge of the harness holder.

In the instrument panel according to the aspect described above, a lower end of the first cutout may be positioned, in a height direction of the vehicle, below a center of the wire harness held by the harness holder.

In the instrument panel according to the aspect described above, the fragile portion may have a second cutout extending from a lower edge toward an upper edge of the harness holder.

In the instrument panel according to the aspect described above, the harness holder may include a pair of the fragile portions respectively provided at two positions on a right and a left in the longitudinal direction of the harness holder.

The instrument panel according to the aspect described above may further include a clip configured to fix the wire harness to the harness holder. The fragile portion may be positioned closer to an end of the harness holder than the clip is.

In the instrument panel according to the aspect described above, the cover may include a side wall extending toward the fragile portion of the harness holder.

In the instrument panel according to the aspect described above, the harness holder may hold the wire harness on a back surface positioned opposite to the cover.

In the instrument panel according to the aspect described above, at least one of an upper edge and a lower edge of the harness holder may include a rim in a region adjacent to the fragile portion.

In the instrument panel according to the aspect described above, the harness holder may be integrated with the instrument panel body.

In the instrument panel according to the aspect described above, a duct may be arranged in front of the harness holder in the front-rear direction of the vehicle.

Details and further improvements of the technology disclosed herein are described in the "DETAILED DESCRIPTION OF EMBODIMENTS" section.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one embodiment of the present technology, a fragile portion may have a first cutout extending from an upper edge toward a lower edge of a harness holder. When the height of an instrument panel is reduced, it is likely that a force from the top is applied to the harness holder pushed by a cover. When the harness holder has the first cutout extending from the upper edge toward the lower edge of the harness holder, the fragile portion is deformed or broken more easily with the first cutout as a start point.

In one embodiment of the present technology, a lower end of the first cutout may be positioned, in a height direction of a vehicle, below a center of a wire harness held by the harness holder. According to such a structure, the harness holder pushed by the cover is easily deformed to tilt its upper part forward in the front-rear direction of the vehicle. Therefore, not only a tensile load but also a torsional load is applied to the fragile portion. As a result, the fragile portion is easily deformed or broken with the lower end of the first cutout as a start point.

In one embodiment of the present technology, the fragile portion may have a second cutout extending upward in the height direction of the vehicle from the lower end of the harness holder. According to such a structure, the sectional area of the fragile portion is further reduced. Therefore, the fragile portion is deformed or broken more easily.

In one embodiment of the present technology, the harness holder may include a pair of the fragile portions at two positions on a right and a left in a longitudinal direction of the harness holder. According to such a structure, when the harness holder is pushed by the cover, a region between the right and left fragile portions is displaced or rotated easily. Therefore, each fragile portion is deformed by a larger amount or is broken more easily.

In one embodiment of the present technology, a clip configured to fix the wire harness to the harness holder may further be provided. In this case, the fragile portion may be positioned closer to an end of the harness holder than the clip is. According to such a structure, when the harness holder is deformed or broken at the fragile portion, the wire harness held by the harness holder moves together with the harness holder. As a result, the movement of the cover can be prevented from being hindered by the wire harness.

In one embodiment of the present technology, the cover may include a side wall extending toward the fragile portion of the harness holder. In other words, when the cover includes the side wall, the fragile portion may be provided in alignment with the position of the side wall. According to such a structure, when the harness holder is pushed by the cover, a load from the cover concentrates on the fragile portion. Therefore, the fragile portion is deformed or broken more easily.

In one embodiment of the present technology, the harness holder may hold the wire harness on a back surface positioned opposite to the cover. According to such a structure, when viewed from the outside of the instrument panel, the wire harness is in a positional relationship in which the wire harness is covered by the harness holder. Therefore, the wire harness is not easily flawed when the instrument panel is attached to the vehicle.

In one embodiment of the present technology, at least one of the upper edge and the lower edge of the harness holder may include a rim in a region adjacent to the fragile portion. According to such a structure, the proof stress of the harness holder decreases more greatly at the position of the fragile portion. Therefore, the fragile portion is deformed or broken more easily. Since the rigidity of the harness holder is improved, the wire harness is held stably.

In one embodiment of the present technology, the harness holder may be integrated with an instrument panel body. As a result, the wire harness can be held by a simple structure as compared with a structure in which the harness holder is provided separately.

In one embodiment of the present technology, a duct may be arranged in front of the harness holder in the front-rear direction of the vehicle. According to such a structure, the duct need not be arranged above a cross member. Therefore, the size of the instrument panel in the height direction can be reduced. In addition, the duct is hollow inside. In the event of collision, the duct is deformed to absorb energy of the collision. Therefore, a reaction force applied to an occupant from the instrument panel can be reduced.

EMBODIMENT

Figure 1:
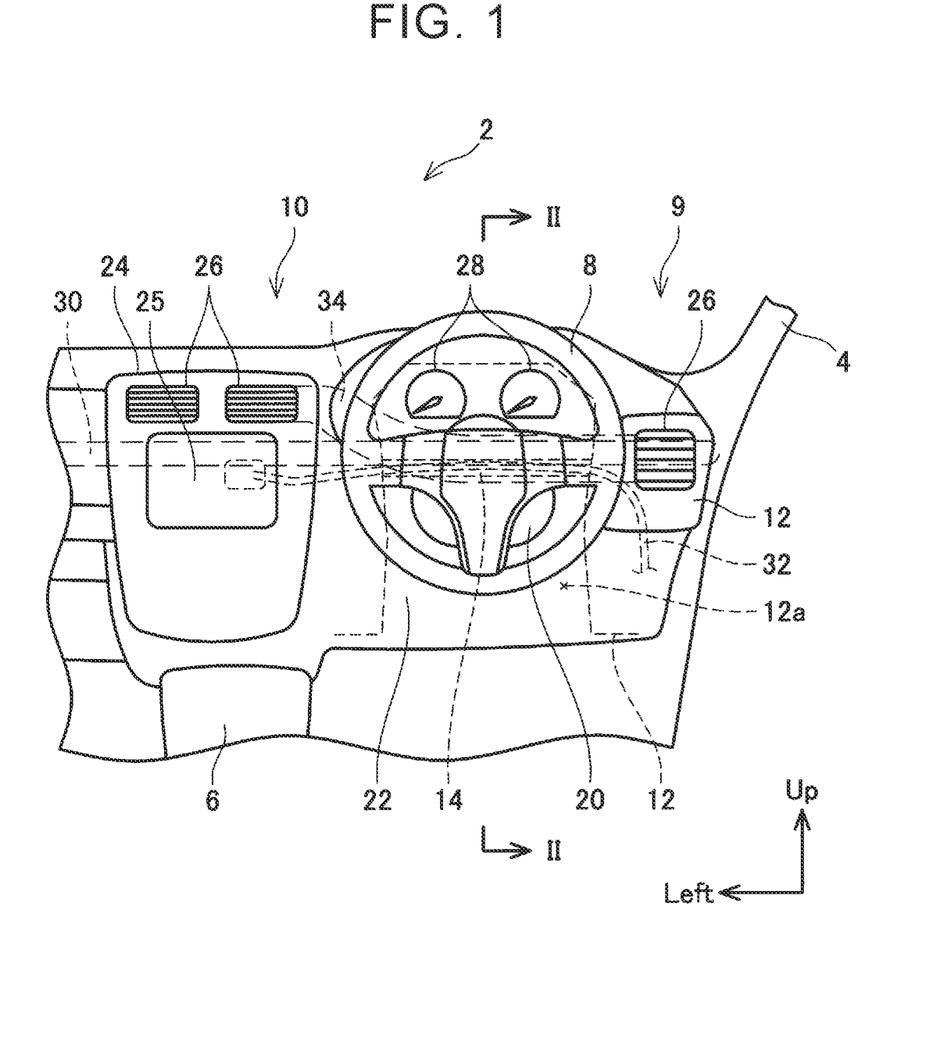
FIG. 1 is a front view of an instrument panel 10 of an embodiment.

An instrument panel of an embodiment will be described with reference to the drawings. FIG. 1 is a front view of an instrument panel 10 of the embodiment (may hereinafter be referred to as "I/P 10"). FIG. 1 illustrates the shape of the I/P 10 viewed from an occupant in a cabin of a vehicle 2 including the I/P 10. FIG. 1 mainly illustrates only the shape of the I/P 10 around a driver's seat, and the shape around a passenger's seat is omitted. The "instrument panel" in a narrow sense means instruments 28. The "instrument panel 10" herein means a component arranged in front of the driver's seat and the passenger's seat in the vehicle 2 in a range from one end to the other end of the vehicle in a vehicle width direction.

An upper side of the vehicle 2 in a height direction (that is, a direction indicated by an arrow Up in the drawings) may be referred to simply as "Up". A lower side of the vehicle 2 in the height direction, on the side opposite to the upper side, may be referred to simply as "Down". A left side of the vehicle 2 in the vehicle width direction (that is, a direction indicated by an arrow Left in the drawings) when viewed from the occupant in the cabin of the vehicle 2 may be referred to simply as "Left". A side opposite to the left side may be referred to simply as "Right". A front side of the vehicle 2 in a front-rear direction (that is, a direction indicated by an arrow Fr in the drawings) may be referred to simply as "Front". A rear side of the vehicle 2 in the front-rear direction, on the side opposite to the front side, may be referred to simply as "Rear".

As illustrated in FIG. 1, the vehicle 2 includes a pillar trim 4, a console 6, a steering wheel 8, a windshield 9, a cross member 30, a wire harness 32, and a duct 34 in addition to the I/P 10. The occupant of the vehicle 2 views a scene ahead of the vehicle 2 through the windshield 9. The opening where the windshield 9 is arranged is defined by the upper surface of the I/P 10 and the inner surface of the pillar trim 4.

The cross member 30 extends in the vehicle width direction and constitutes the body of the vehicle 2. The cross member 30 connects the right side and the left side of the vehicle body. The cross member 30 is typically a pipe made of an ultra-high tensile strength steel sheet. The cross member 30 arranged inside the I/P 10 may also be referred to as "instrument panel reinforcement".

The I/P 10 includes an instrument panel body 12, a column cover 20, an undercover 22, a center cover 24, the instruments 28, and a plurality of air outlets 26. The instrument panel body 12 is fixed to the cross member 30. The instrument panel body 12 is made of a resin. The instrument panel body 12 is a component serving as a base for the I/P 10. The instrument panel body 12 has a space 12a. A lower side of the space 12a is open to allow, for example, a steering shaft 36 (see FIG. 2) connected to the steering wheel 8 to pass from the bottom. A harness holder 14 is provided at the middle of the space 12a in a height direction. Details of the harness holder 14 will be described later with reference to FIG. 3. The space 12a is covered by the column cover 20 and the undercover 22 from the rear in the front-rear direction of the vehicle. The instrument panel body 12 is also covered by the center cover 24 and the like, but partially exposed to the cabin (that is, a near side of the drawing sheet of FIG. 1).

The column cover 20 is a resin cover positioned between the I/P 10 and the steering wheel 8, and is composed of two components divided in the height direction. The undercover 22 is a resin cover that covers a lower part of the instrument panel body 12 near the driver's seat. The center cover 24 is a resin cover positioned at the middle of the I/P 10. A display 25 that provides the occupant with various kinds of information such as position information of the vehicle 2 is arranged at the middle of the center cover 24. The instruments 28 are meters that provide the occupant with various kinds of information such as a traveling speed of the vehicle 2. The air outlets 26 are openings that blow, into the cabin through the duct 34, air supplied from an air conditioner (not illustrated) arranged at the middle in the vehicle width direction of the vehicle 2 inside the I/P 10.

As illustrated in FIG. 1, the wire harness 32 and the duct 34 are arranged inside the I/P 10 in addition to the cross member 30. The wire harness 32 branches from a main harness (not illustrated) arranged on a floor panel of the vehicle 2, and passes through the inside of the I/P 10 to supply electric power, signals, and the like to, for example, the display 25 or output signals input to the display 25 or the like.

A structure inside the I/P 10 will be described with reference to FIG. 2. Inside the I/P 10, the steering shaft 36 extends in the front-rear direction through the space 12a. The steering shaft 36 is held by the cross member 30 via a bracket 38. The steering shaft 36 rotatably holds the steering wheel 8, and its front end is held by the floor panel (not illustrated) of the vehicle 2. The column cover 20 covers the steering shaft 36 between the I/P 10 and the steering wheel 8. As a result, the column cover 20 faces the occupant (not illustrated) who steers the steering wheel 8 in the front-rear direction of the vehicle. That is, the column cover 20 is an example of a "cover" in this embodiment.

Figure 2:
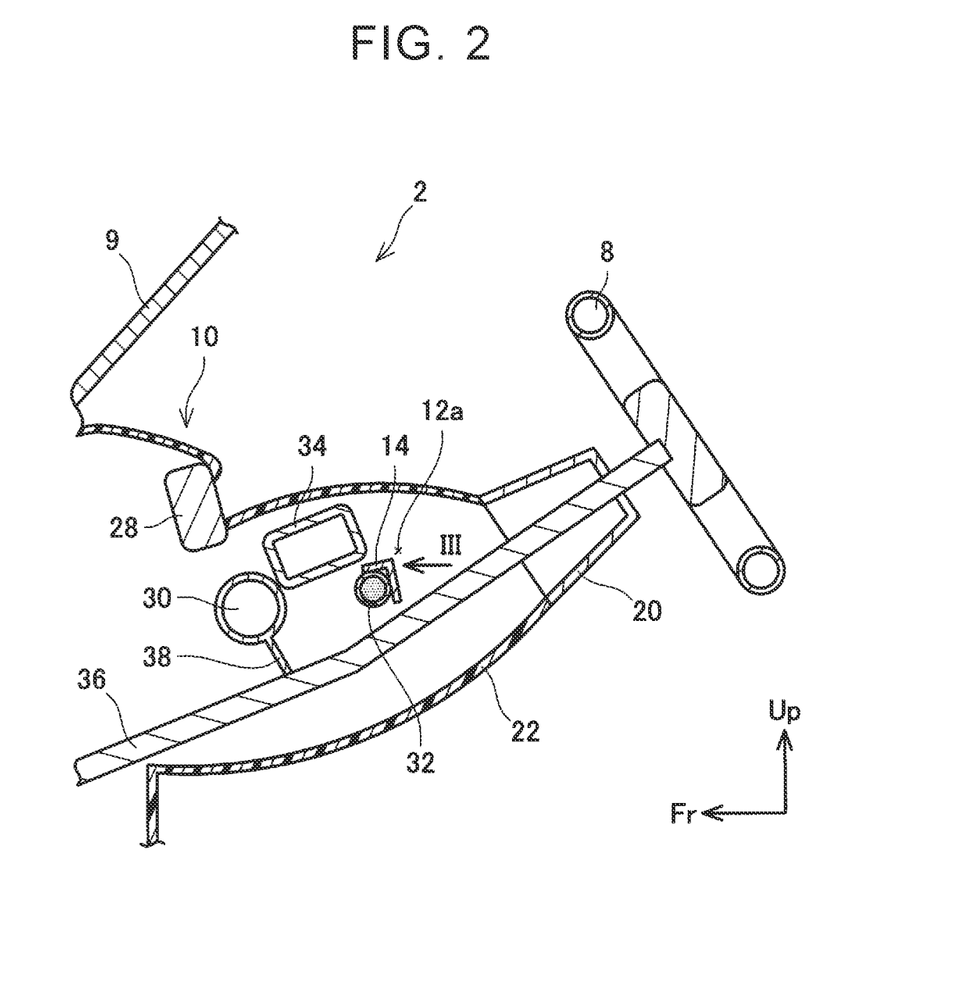
FIG. 2 is a sectional view taken along a line II-II in FIG. 1.

As illustrated in FIG. 2, the duct 34 is arranged behind the cross member 30 (that is, on a right side of the drawing sheet of FIG. 2). The wire harness 32 is arranged behind the duct 34. By positioning the duct 34 and the wire harness 32 adjacent to each other behind the cross member 30, the height of the I/P 10 in the height direction can be reduced. As a result, the position of the upper surface of the I/P 10 is lowered. Therefore, the windshield 9 can be enlarged in the height direction. Thus, the occupant can be provided with a wide interior space and a wide view.

As illustrated in FIG. 1, the wire harness 32 extends in the vehicle width direction along the cross member 30. The wire harness 32 is a bundle of a plurality of electric wires. Therefore, the wire harness 32 extending along the cross member 30 tends to sag at the middle. The wire harness 32 is fixed to the harness holder 14. As a result, the sag of the wire harness 32 is suppressed.

When a frontal collision occurs to the vehicle 2, the occupant (not illustrated) moves forward due to an inertial force. At that time, the occupant comes into contact with the steering wheel 8 and the column cover 20. When the occupant further moves forward, the column cover 20 enters the space 12a and abuts against the harness holder 14 from the rear. If the harness holder 14 has high rigidity and the forward movement of the column cover 20 is restricted by the harness holder 14, the I/P 10 cannot be deformed sufficiently.

Figure 3:
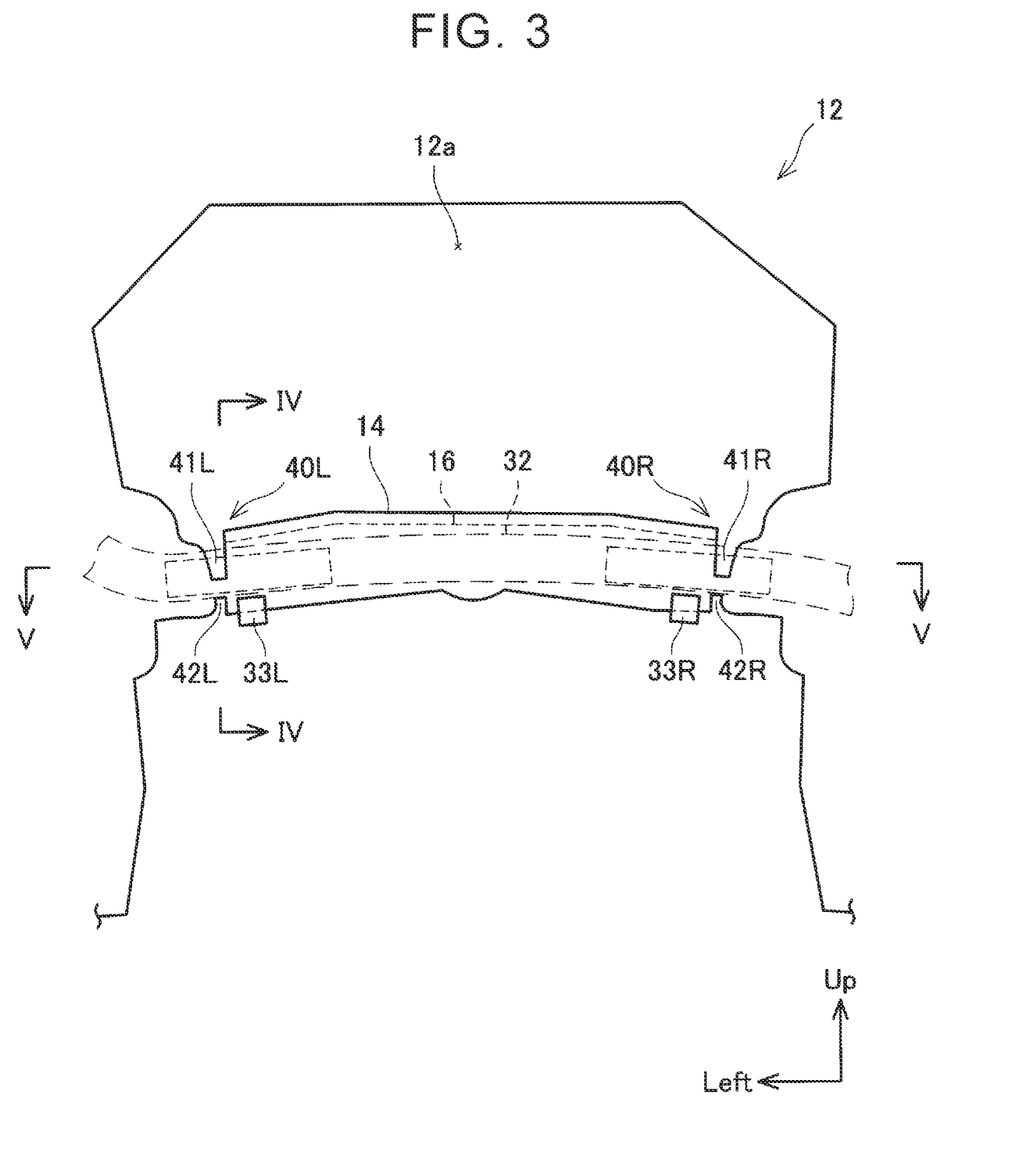
FIG. 3 is an arrow view in a direction indicated by an arrow III in FIG. 2.

Details of the harness holder 14 will be described with reference to FIG. 3. FIG. 3 is an arrow view of the harness holder 14 along a direction indicated by an arrow III in FIG. 2. In FIG. 3, the duct 34 and the cross member 30 are not illustrated for the sake of understanding. The harness holder 14 is integrated with the instrument panel body 12, and couples a right side and a middle of the instrument panel body 12. The harness holder 14 crosses the space 12a. The harness holder 14 includes a pair of clips 33R and 33L. The clips 33R and 33L are resin clips for fixing the wire harness 32 to the harness holder 14.

A pair of fragile portions 40R and 40L is provided at both ends of the harness holder 14 in a longitudinal direction (that is, a lateral direction of the drawing sheet of FIG. 3). The right fragile portion 40R includes a first cutout 41R extending downward from the upper end of the harness holder 14, and a second cutout 42R extending upward from the lower end of the harness holder 14. Similarly, the left fragile portion 40L includes a first cutout 41L and a second cutout 42L. As a result, the sectional areas of the fragile portions 40R and 40L are smaller than that of the other portion of the harness holder 14 (i.e., the sectional areas of the fragile portions 40R and 40L are smaller than the sectional area of the rest of the harness holder 14).

As described above, when a frontal collision occurs to the vehicle 2 (see FIG. 1), the column cover 20 pushed by the occupant abuts against the harness holder 14. At this time, the harness holder 14 receives a forward load from the column cover 20. The fragile portions 40R and 40L having the small sectional areas are easily deformed or broken when receiving the load from the column cover 20. Therefore, the column cover 20 moves further forward while deforming or breaking the fragile portions 40R and 40L. In this manner, the I/P 10 of this embodiment can sufficiently be deformed by the fragile portions 40R and 40L.

The fragile portions 40R and 40L are positioned on an outer side of the clips 33R and 33L, respectively. In other words, the clips 33R and 33L are positioned closer to the middle of the harness holder 14 in the longitudinal direction (that is, the lateral direction of the drawing sheet of FIG. 3) than the fragile portions 40R and 40L, respectively. That is, the fragile portions 40R and 40L are positioned closer to the ends of the harness holder 14 than the clips 33R and 33L, respectively. When the harness holder 14 is deformed or broken at the fragile portions 40R and 40L, the wire harness 32 held by the harness holder 14 moves together with the harness holder 14. As a result, the movement of the column cover 20 can be prevented from being hindered by the wire harness 32.

Figure 4:
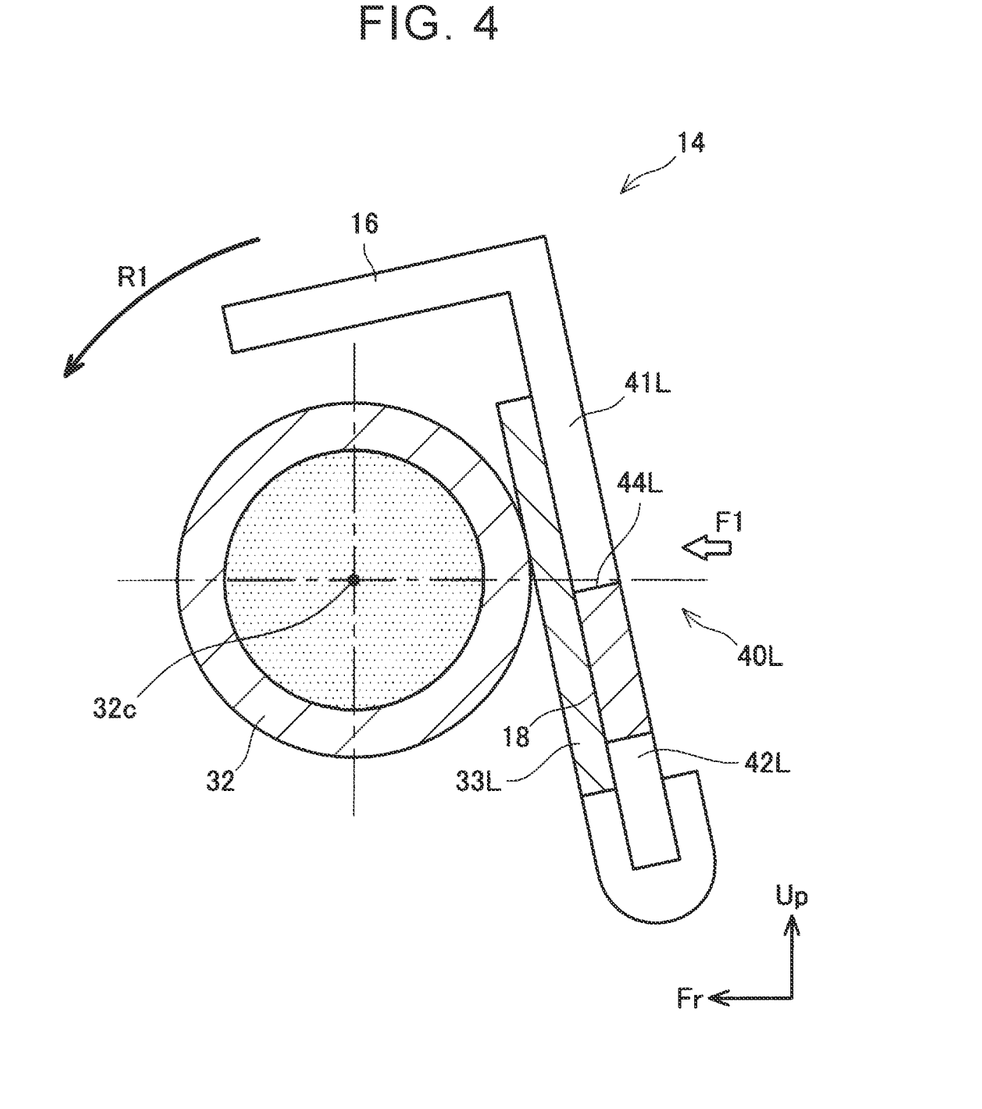
FIG. 4 is a sectional view taken along a line IV-IV in FIG. 3.

Details of the left fragile portion 40L will be described with reference to FIG. 4. Although the left fragile portion 40L will mainly be described herein, the right fragile portion 40R also has the same structure.

The harness holder 14 has a back surface 18 on the front side in the front-rear direction of the vehicle. The back surface 18 faces the cross member 30 (see FIG. 2). The clip 33L holds the lower end of the harness holder 14 from the bottom. As a result, the clip 33L is fixed to the back surface 18 of the harness holder 14. The back surface 18 holds the wire harness 32 via the clip 33L. By holding the wire harness 32 on the back surface 18, the wire harness 32 is covered by the harness holder 14 when viewed from the outside of the I/P 10 (that is, a right side of the drawing sheet of FIG. 4). For example, when the I/P 10 is attached to the body of the vehicle 2, the wire harness 32 is unlikely to come into contact with an operator, components of the I/P 10, or the like. That is, the wire harness 32 is not easily flawed.

A rim 16 extending in the front-rear direction is provided on the upper edge of the harness holder 14. The rim 16 is positioned between the fragile portions 40R and 40L. That is, the rim 16 is provided in a region adjacent to the fragile portions 40R and 40L. The rim 16 improves the rigidity of the harness holder 14. The rim 16 particularly suppresses deformation of the harness holder 14 extending in the vehicle width direction, that is, bending of the harness holder 14 in its longitudinal direction. As a result, the harness holder 14 can stably hold the wire harness 32. By improving the rigidity of the harness holder 14 in the region where the rim 16 is provided, a difference in the rigidity between the region where the rim 16 is provided and each of the fragile portions 40R and 40L increases. As a result, the proof stress of the harness holder 14 decreases more greatly at the positions of the fragile portions 40R and 40L. Therefore, the fragile portions 40R and 40L are deformed or broken more easily. The rim 16 extends to cover the upper part of the wire harness 32. Thus, when the I/P 10 is attached, the wire harness 32 is more unlikely to come into contact with the operator, the components of the I/P 10, or the like.

As described above, the fragile portion 40L includes the first cutout 41L and the second cutout 42L. As illustrated in FIG. 4, the length of the first cutout 41L in the height direction is larger than the length of the second cutout 42L in the height direction. A first lower end 44L of the first cutout 41L is positioned below a center 32c of the wire harness 32. Therefore, when the column cover 20 applies a load F1 to the harness holder 14 in the event of collision, the harness holder 14 easily rotates to tilt its upper end forward (see an arrow R1 in FIG. 4). As a result, a torsional load caused by the rotation in the direction of the arrow R1 is applied to the fragile portion 40L in addition to a tensile load caused by the forward push by the load Fl. As a result, the fragile portion 40L is easily deformed or broken at a start point corresponding to the lower end 44L.

Figure 5:
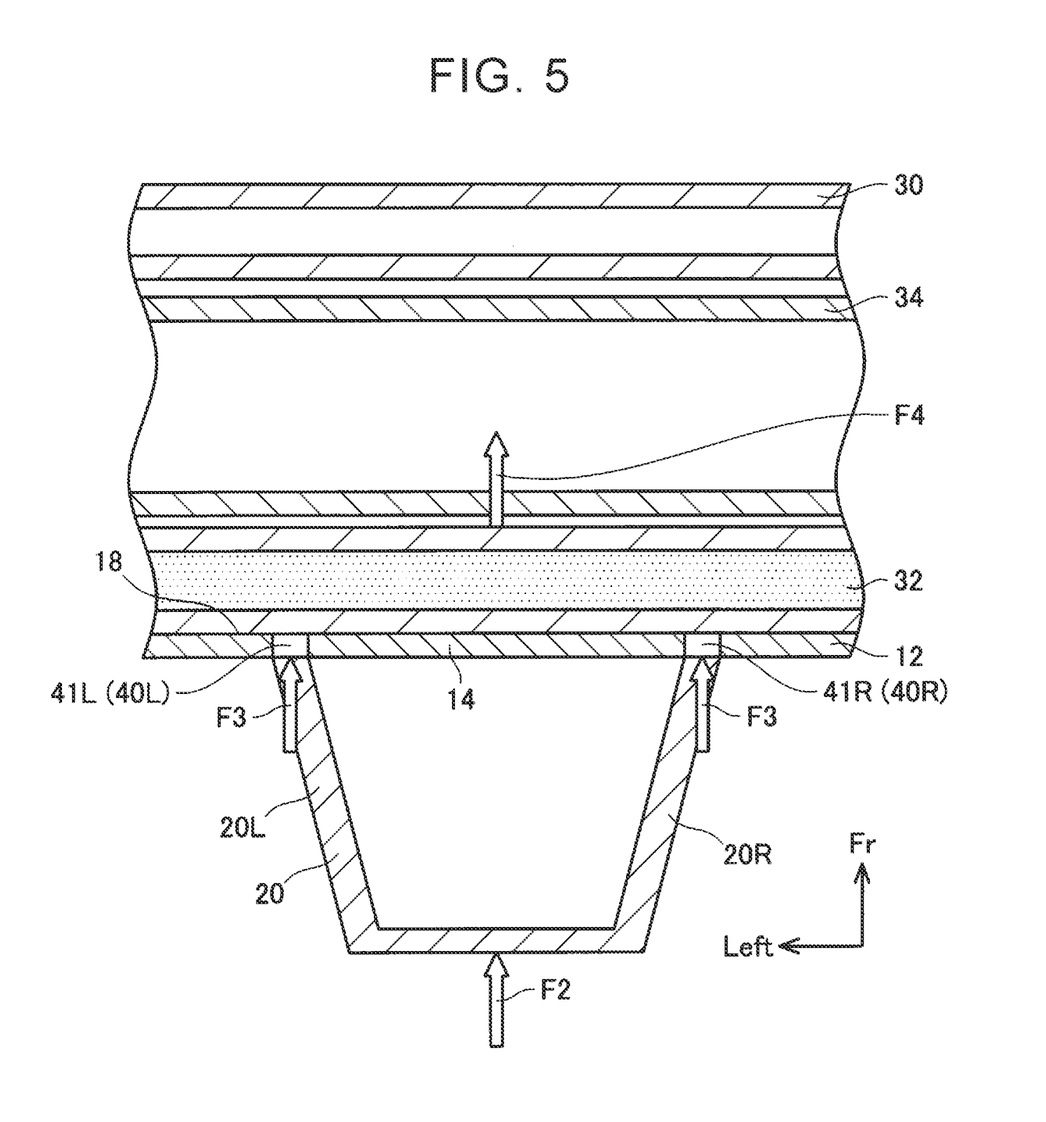
FIG. 5 is a sectional view taken along a line V-V in FIG. 3.

Referring to FIG. 5, description is given of how a load applied to the I/P 10 from the occupant is transferred when a frontal collision occurs to the vehicle 2 (see FIG. 1). Other components may also exist between the column cover 20 and the harness holder 14. FIG. 5 illustrates only the components that greatly contribute to deformation of the I/P 10 in the event of collision. As illustrated in FIG. 5, the column cover 20 includes a pair of side walls 20R and 20L extending in the front-rear direction toward the fragile portions 40R and 40L of the harness holder 14. When a frontal collision occurs and the occupant moves forward due to an inertial force, a load F2 is transferred from the rear to the column cover 20 via the steering wheel 8 (see FIG. 2). As a result, the column cover 20 moves forward to abut against the harness holder 14 of the instrument panel body 12.

As illustrated in FIG. 5, the load F2 is distributed to the side walls 20R and 20L and transferred to the harness holder 14 as a pair of loads F3. The side walls 20R and 20L extending in the front-rear direction are less likely to be deformed due to the load in the front-rear direction than the harness holder 14 extending in the vehicle width direction. Therefore, the side walls 20R and 20L can easily transfer the load in the front-rear direction to the harness holder 14. The side walls 20R and 20L of the column cover 20 extend toward the fragile portions 40R and 40L of the harness holder 14. Therefore, the side walls 20R and 20L of the column cover 20 that have moved forward abut against the fragile portions 40R and 40L. As a result, the load F3 transferred to the column cover 20 concentrates on the fragile portions 40R and 40L as a pair of loads F3. As a result, the fragile portions 40R and 40L are deformed or broken easily.

The fragile portions may be provided on the side walls 20R and 20L of the column cover 20. As illustrated in FIG. 1, however, the column cover 20 is a component exposed to the cabin and may come into contact with the occupant. Therefore, when the column cover 20 has the fragile portions, the column cover 20 may be deformed or broken due to contact other than contact in the event of collision. The I/P 10 of this embodiment includes the fragile portions 40R and 40L at the parts of the instrument panel body 12 that are covered by the column cover 20. Therefore, the fragile portions 40R and 40L can be prevented from being deformed or broken due to an event other than the event of collision.

The deformed or broken harness holder 14 moves forward together with the wire harness 32. The duct 34 is arranged in front of the harness holder 14. As a result, the harness holder 14 and the wire harness 32 that have moved forward apply a load F4 to the duct 34. The duct 34 is a hollow resin component and is therefore deformed by the load F4. The harness holder 14 and the wire harness 32 move further forward while deforming the duct 34. Through the deformation, the duct 34 absorbs energy generated in the event of collision. As a result, a reaction force applied to the occupant from the I/P 10 can be reduced.

As described above, the I/P 10 disclosed herein includes the fragile portions 40R and 40L in the harness holder 14 of the instrument panel body 12. Thus, the I/P 10 can sufficiently be deformed even when the wire harness 32 crosses the space 12a.

While the embodiment has been described in detail above, the embodiment is merely exemplary, and does not limit the scope of the claims. The technology defined in the claims includes various modifications and alterations to the specific example described above. Modifications of the embodiment described above will be listed below.

First Modification

In the embodiment described above, the lower side of the space 12a is open. In a modification, the space 12a may be an opening of which the entire periphery may be closed. In a further modification, an upper side, a left side, or a right side of the space 12a may be open.

Second Modification

In the embodiment described above, the harness holder 14 crosses (extends in) the space 12a in the vehicle width direction. "The harness holder 14 crossing the space 12a" includes the harness holder 14 inclining and crossing the space 12a in the vehicle width direction. In a modification, the harness holder 14 may pass through (extend in) the space 12a in the height direction. The harness holder 14 passing through the space 12a includes the harness holder 14 inclining and passing through the space in the height direction.

Third Modification

The fragile portion 40R need not have the cutouts 41R and 42L to reduce its sectional area. For example, in a modification, the fragile portion 40R may have a small sectional area by including a thin portion whose thickness is smaller than that of the other portion. In a further modification, the fragile portion 40R may include both the cutout and the thin portion.

Fourth Modification

In the embodiment described above, the technology disclosed herein is applied to the occupant on the driver's seat of the vehicle 2. In a modification, the technology disclosed herein may be applied to an occupant on the passenger's seat. In that case, a glove box is an example of the "cover".

Fifth Modification

The fragile portion 40R need not have the second cutout 42R. In another modification, the fragile portion 40R need not have the first cutout 41R. In that case, the upper end of the second cutout 42R may be positioned above the center 32c of the wire harness 32. In this modification, the harness holder 14 rotates to lift its lower end forward.

Sixth Modification

The fragile portions need not be arranged in pairs in the longitudinal direction of the harness holder 14. For example, the harness holder 14 may include only the right fragile portion 40R. Alternatively, the harness holder 14 may include fragile portions 40R and 40L having different shapes on the right and left.

Seventh Modification

The harness holder 14 need not hold the wire harness 32 with the clips 33R and 33L. In a modification, for example, the harness holder 14 may allow the wire harness 32 to pass through an opening in the harness holder 14, so holding the wire harness 32 is not necessary. Alternatively, the wire harness 32 may be held by the harness holder 14 with one clip 33R.

Eighth Modification

The fragile portions 40R and 40L need not face the side walls 20R and 20L in the front-rear direction. Alternatively, only one of the fragile portions 40R and 40L may face the side wall.

Ninth Modification

The wire harness 32 may be held on the rear surface of the harness holder 14 (i.e. surface on the rear side in the front-rear direction of the vehicle). That is, the harness holder 14 need not have the back surface 18.

Tenth Modification

The harness holder 14 need not have the rim 16. In a further modification, the rim 16 may extend toward the rear of the vehicle or may be provided at the lower end of the harness holder 14.

Eleventh Modification

In the embodiment described above, the harness holder 14 is integrated with the instrument panel body 12. In a modification, the harness holder 14 may be a component separated from the instrument panel body 12.

Twelfth Modification

The duct 34 need not be arranged between the harness holder 14 and the cross member 30. In that case, for example, a member that absorbs energy in the event of collision (energy absorption (EA) member) may be arranged instead of the duct 34.

While the specific examples of the present disclosure have been described in detail above, the specific examples are merely exemplary, and do not limit the scope of the claims. The technology defined in the claims includes various modifications and alterations to the specific examples described above. The technical elements described herein or illustrated in the drawings exhibit technical utility solely or in various combinations, and are not limited to the combination described in the claims as filed. The technologies described herein or illustrated in the drawings may simultaneously achieve a plurality of objects, and exhibit technical utility by achieving one of the objects.

What is claimed is:

1. An instrument panel comprising:
an instrument panel body fixed to a vehicle body; and
a cover that covers a space of the instrument panel body from a rear in a front-rear direction of a vehicle and faces an occupant in the front-rear direction of the vehicle, wherein:
the instrument panel body includes a harness holder configured to hold a wire harness arranged in a vehicle width direction;
the harness holder extends along the vehicle width direction in the space of the instrument panel body, and includes a fragile portion provided in at least one position in a longitudinal direction of the harness holder; and
a sectional area of the fragile portion is smaller than a sectional area of another portion of the harness holder.

2. The instrument panel according to claim 1, wherein the fragile portion has a first cutout extending from an upper edge toward a lower edge of the harness holder.

3. The instrument panel according to claim 2, wherein a lower end of the first cutout is positioned, in a height direction of the vehicle, below a center of the wire harness held by the harness holder.

4. The instrument panel according to claim 2, wherein the fragile portion has a second cutout extending from a lower edge toward an upper edge of the harness holder.

5. The instrument panel according to claim 1, wherein the harness holder includes a pair of the fragile portions respectively provided at two positions on a right and a left in the longitudinal direction of the harness holder.

6. The instrument panel according to claim 1, further comprising a clip configured to fix the wire harness to the harness holder, wherein the fragile portion is positioned closer to an end of the harness holder than the clip is.

7. The instrument panel according to claim 1, wherein the cover includes a side wall extending toward the fragile portion of the harness holder.

8. The instrument panel according to claim 1, wherein the harness holder holds the wire harness on a back surface positioned opposite to the cover.

9. The instrument panel according to claim 1, wherein at least one of an upper edge and a lower edge of the harness holder includes a rim in a region adjacent to the fragile portion.

10. The instrument panel according to claim 1, wherein the harness holder is integrated with the instrument panel body.

11. The instrument panel according to claim 1, wherein a duct is arranged in front of the harness holder in the front-rear direction of the vehicle.

* * * * *